May 19, 1970   J. M. FRANCIS ET AL   3,512,342
CLEAN-BOLL SEPARATOR CONVEYOR FOR COTTON HARVESTER
Filed July 1, 1968   2 Sheets-Sheet 1
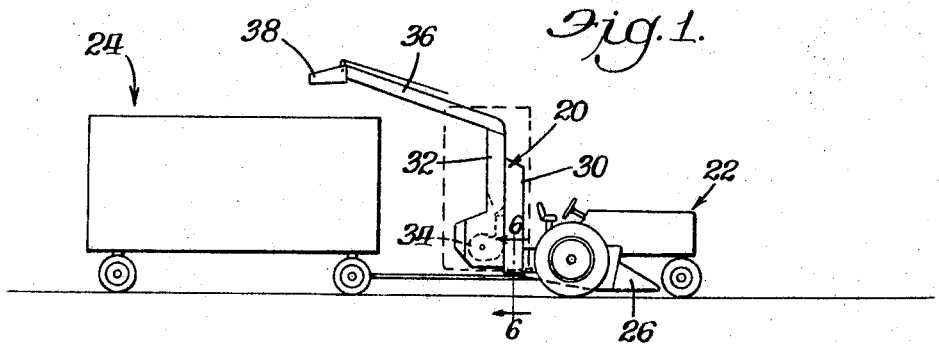
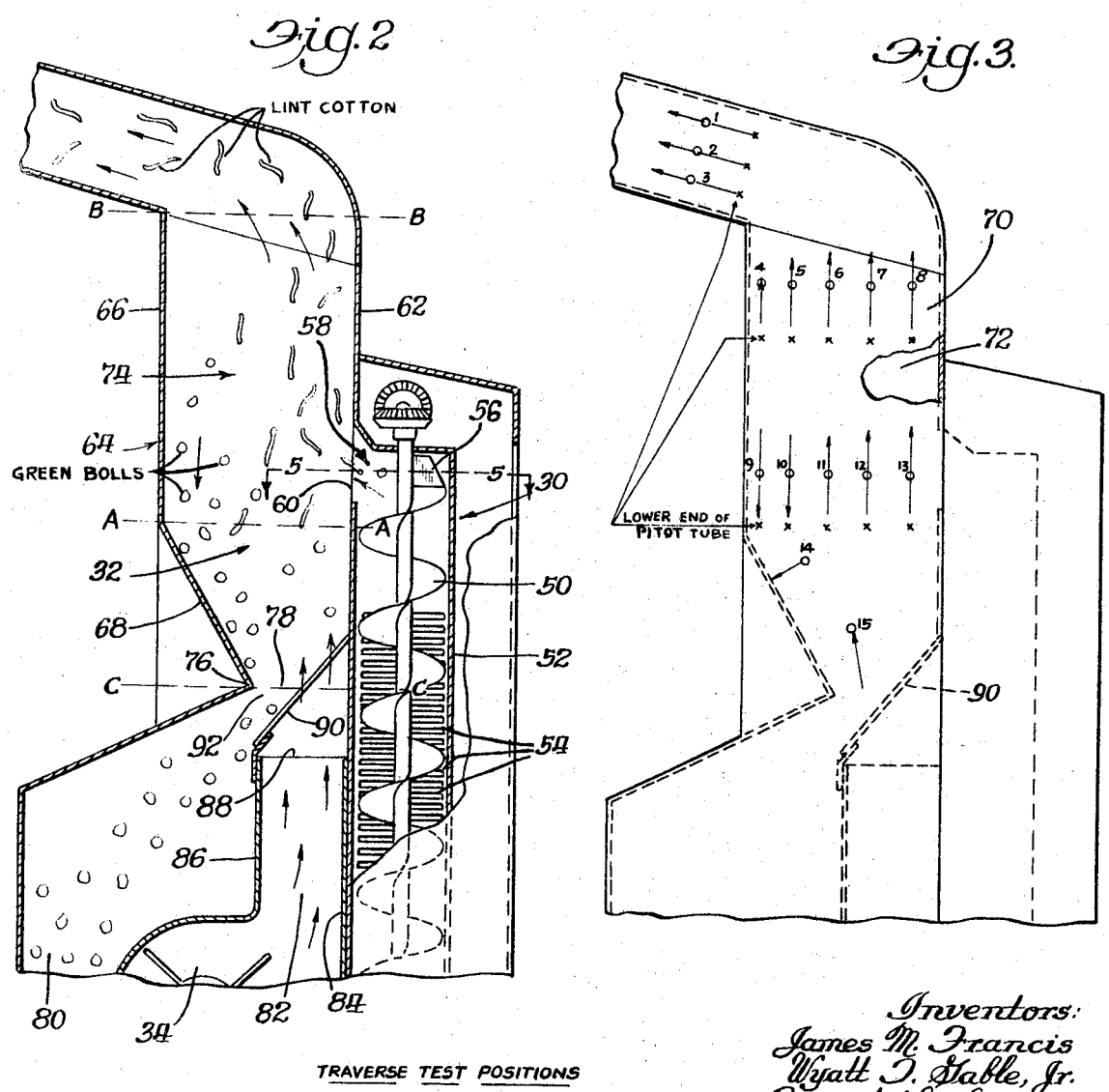
Inventors:
James M. Francis
Wyatt T. Gable, Jr.
Forrest L. Simpson
Paul J. Hulseberg
By John J. Kowalik
Atty.

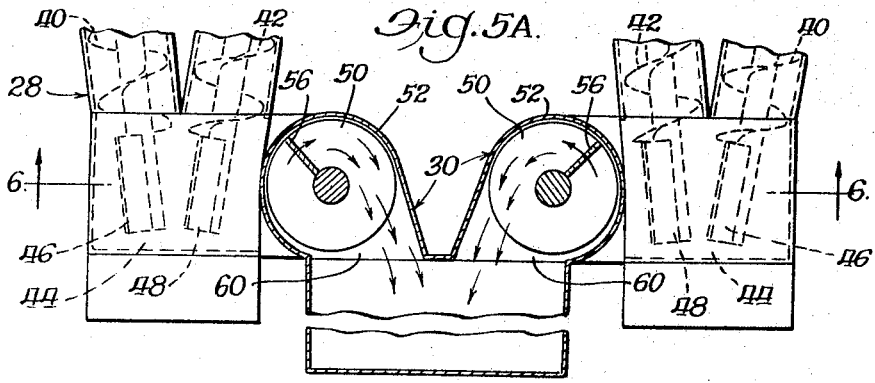
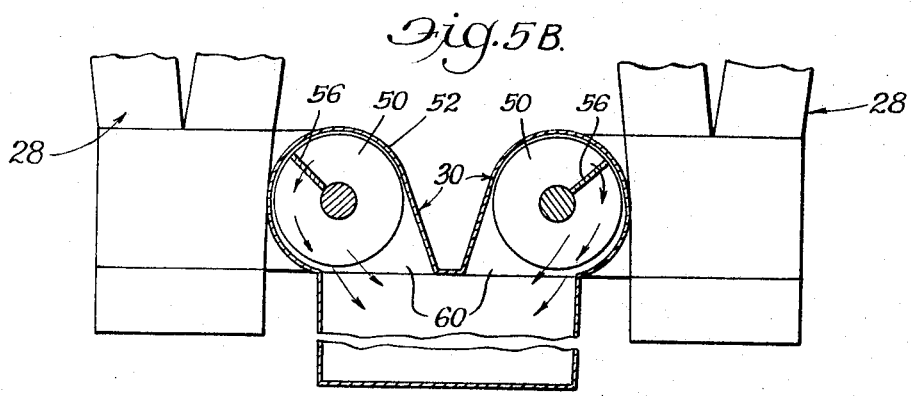
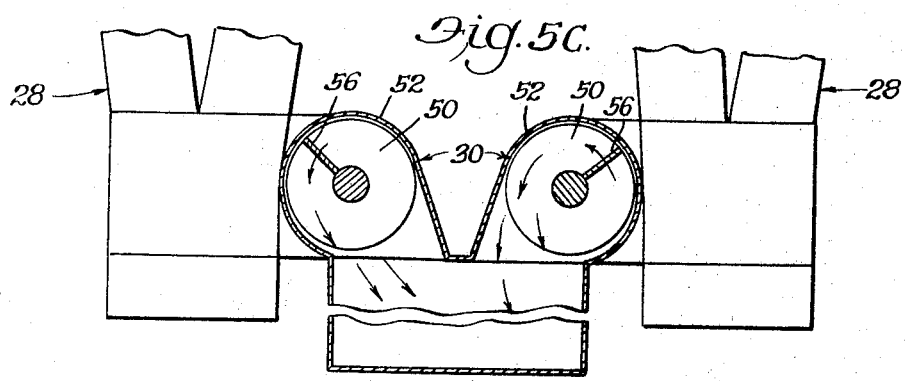
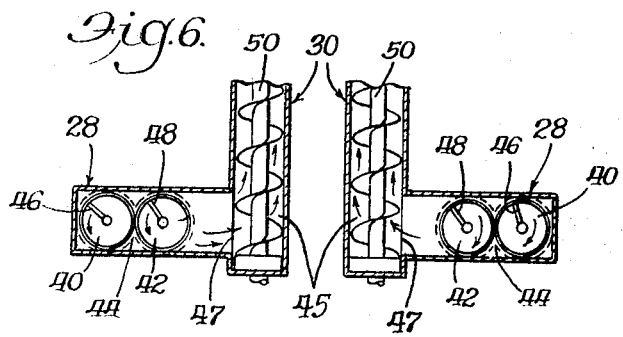

United States Patent Office 3,512,342
Patented May 19, 1970

3,512,342
CLEAN-BOLL SEPARATOR CONVEYOR FOR COTTON HARVESTER
James M. Francis, Wyatt T. Gable, Jr., Forrest L. Simpson, and Paul J. Hulseberg, Memphis, Tenn., assignors to International Harvester Company, Chicago, Ill., a corporation of Delaware
Filed July 1, 1968, Ser. No. 741,722
Int. Cl. A01d 45/20
U.S. Cl. 56—30                                       5 Claims

ABSTRACT OF THE DISCLOSURE

Cotton stripper having a primary separator which utilizes a generally vertical auger enclosed in a perforate housing being operative for separating trash from a harvested aggregate while advancing the same, and subsequently impelling a residue of essentially lint cotton and green bolls into a pneumatic secondary separator having a main air stream and an adjacent counter air stream flowing therein, wherein the main air stream is effective for initially separating a bulk of the lint cotton from the green bolls, any remaining lint cotton with the green bolls then enter the counter air stream which serves to return the same into main air stream for final separation of the lint cotton from the green bolls which gravitate into a collector.

GENERAL FIELD OF INVENTION

In certain areas cotton is planted of the type which is adaptable for stripper-harvesting. This is generally characterized by removing all of the lint cotton and green bolls simultaneously from the plant in the same field operation. The machines usually employed for that end are of the cotton stripper type and are effective for stripping the plant of both lint cotton and green bolls. Invariably, however, trash consisting of twigs and leaves are also gathered during this operation resulting in a harvested aggregate, of lint cotton, green bolls and trash, that must eventually be separated. The invention relates to the problem of separating and segregating the above mentioned constituents. It is desirable where pneumatic separation and conveying means are employed to separate the trash before subjecting the aggregate to the pneumatic separation. If this is done it is possible to take advantage of the extreme diversity of densities between the two remaining constituents, namely, the lint cotton and green bolls. The pneumatic separation normally is operative for separating and conveying the lint cotton into a suitable recepacle leaving the green bolls to be collected in an associated container for further processing.

OBJECTS OF THE PRESENT INVENTION

A general and broad object of the present invention is to provide a novel construction applicable to cotton harvesting of the foregoing general character which is capable of more effectively separating the trash, green bolls and lint cotton from each other.

A more specific object is to combine two separators having different operational principles, namely, a first mechanical separator for removing trash and second pneumatic separator for separating the lint cotton from the green bolls, wherein the combination is an efficient separating device.

A still further object is that the first mechanical separator comprising an auger assembly into which an aggregate from the stripper units is fed, and that said assembly includes an auger and an encompassing housing with perforations, wherein the aggregate is advanced through the housing and worked against the perforations forcing the trash therethrough.

Another object is that the auger assembly have a generally vertical orientation which serves to promote the separating action resulting in improved separation of the trash from the aggregate.

A still further object is that the primary separation also serves as conveying means for transferring a residue conglomerate of lint cotton green bolls into a position for introduction into the pneumatic secondary separator and include means for impelling said conglomerate into said secondary separator.

A still more specific object is that the impelling means be incorporated in the auger assembly in that the auger at the position for introduction of the conglomerate into the secondary separator have a paddle affixed thereto for engaging and flinging said conglomerate from said auger housing into said secondary separator.

Another object of the invention is that the secondary separator comprise a duct-like structure and a blower for producing a main air stream therein, and said duct-like structure embodying means for producing an air counter flow adjacent the main air stream wherein the main air stream separates and carries the lint cotton into an associated receptacle and the air counter flow being operative for recycling unseparated lint cotton into the main air stream.

A still further object of the invention is that the means for producing the air counter flow within the secondary means have a static nature and inherent in the structural make-up of the duct-like structure and interacting with said main air stream to produce said air counter flow.

A still further object of the structural make-up of the duct-like structure is to provide a green boll raceway for channeling the green bolls into an associated container.

BRIEF DESCRIPTION OF THE DRAWINGS

FIG. 1 is a small scale semi-diagrammatic view of a cotton stripper embodying the features of the present invention, and related implements;

FIG. 2 is a large vertical section with parts broken away of the arrangement shown circumscribed by dashed lines in FIG. 1, and oriented according to FIG. 1;

FIG. 3 is a large elevation view of essentially the pneumatic duct portion of the arrangement shown in FIG. 2 and denoting locations of air velocity test stations on the duct with each station having a numerical designation;

FIG. 4 is a top view of the typical testing station as indicated in FIG. 3 showing traverse air velocity test positions within the duct, each position identified by an alphabetical designation;

FIG. 5(a) is a plan view of that portion of the dual auger-separators, with parts broken away, taken substantially at line 5—5 of FIG. 2 and showing augers opposingly rotating for crosswise pattern of distribution, and a portion of an auger-conveyor in dispositional relationship with its respective auger-separator;

FIG. 5(b) is same as FIG. 5(a) but showing augers opposingly rotating for divergent pattern of distribution;

FIG. 5(c) is same as FIG. 5(a) but showing auger rotating in the same direction for a contiguous pattern of distribution;

FIG. 6 is an elevational view taken substantially at line 6—6 of FIG. 1 showing the discharge-receiving relationship of the auger conveyors to the vertical auger-separator assembly respectively.

DESCRIPTION OF THE PREFERRED EMBODIMENT

Referring in detail to FIG. 1, a cotton stripper-separator is indicated in its entirety at 20 and drawn by a suitable implement 22 such as a tractor, which pulls a trailer 24. The stripper-separator 20 includes a stripper unit 26 which engages the cotton plants and strips them of their lint cotton and unripened green bolls. In the stripping process trash, comprisingly mainly of sticks, burrs and leaves, is also collected and an entire aggregate of lint cotton, green bolls and trash is deposited in a conveyor auger system generally designated 28 (FIG. 6) which transports the aggregate from the stripper unit 26 to a substantially vertical auger-separator assembly generally designated 30.

The auger-separator 30 is effective for removing trash from the aggregate and delivers a conglomeration comprising of substantially lint cotton and green bolls into a pneumatic separator 32 for separation of the lint cotton from the green bolls. The blower 34 produces a main air stream within the separator 32 as a medium for the separation and is also effective to carry the separated lint cotton through a discharge conduit 36 to a terminal end 38 which directs the lint cotton into the trailer 24. The rearward discharge of the cotton into trailer 14 is not in itself relevant to the instant invention herein described inasmuch as the discharge conduit could be adapted to discharge forwardly into a basket (not shown) mounted over the tractor 22 without affecting the essence of the instant invention.

It should be noted at this time that FIGS. 5(a) and 6 are typically representative of a dual conveyor auger system and vertical auger-separator assembly; for the stripper-separator 20 incorporates duel stripper units 26, one mounted on each side of the tractor 22. The novel principles of separation of the instant invention hereinafter described would not be critically affected if a single stripper device were employed although a dual auger-dual stripper arrangement has peculiar unobvious advantages hereinafter discussed. Since dual stripper units are used, it should be noted that the right and left hand stripper units 26, conveyer auger system 28 and vertical auger-separator 30 and their associated members and components are substantially identical. Therefore, for clarity the same designations will be assigned to components on each side and the corresponding description will apply to both the right and left portions of the stripper-separator.

FIGS. 5(a) and 6 show that the conveyor-auger system 28 comprises two enclosed converging augers 40, 42 which discharge the aggregate from the stripper unit 26 into a housing enclosure 44. The outboard augers 40 and inboard augers 42 have paddles 46 and 48, respectively axially affixed to the end of each auger in radial extension thereof. The paddles 46, 48 are disposed within the housing enclosure 44 and being constrained to rotate with the augers 40 and 42 respectively, within said space 44. The auger-separators 30 each have a lower intake portion 45 which communicates with said housing enclosure 44 through an aggregate intake opening 47, wherein the enclosure 44, opening 47 and the lower intake portion 45 are in general horizontal disposition with respect to each other. Therefore, as the aggregate is conveyed by the augers (40, 42) into the space 44 the outboard paddle 46 kicks aggregate into the loci of paddle 42 which in turn directly impels this aggregate, and also the aggregate it receives, transversely through said opening 47 into the lower portion 45 of the vertical auger-separator assembly 30. It should be appreciated that by disposing the conveying augers 40, 42, into direct discharge-receiving relationship with the vertical auger-separator assembly 30 and utilizing paddles (46, 48) affixed to the end of said augers (40, 42), that transverse conveying devices, normally used in stripper-separators of this general type, have been entirely eliminated.

The vertical auger-separator assembly 30, as best seen in FIG. 2, comprises a pair of substantially vertical augers 50 enclosed in an encompassing housing 52 having slot-like perforations 54 uniformly spaced about exteriorly exposed portions of the housing 52. The upper portion of each auger 50 terminates in an axially elongated paddle-like element 56 disposed in radial extension with respect to its respective auger 50 and affixed thereto. This element 56 is constrained to rotate with its auger 50 and revolves within an upper discharge portion generally designated 58 of housing 52. The auger 50 is rotated to move the aggregate upwardly through the housing 52 which simultaneously imparts a rotary motion to the upwardly moving aggregate whereby the combined effect of these motions result in a working of the aggregate against the perforations 54 in the housing 52 forcing trash therethrough thereby effecting a separation of the trash from the lint cotton and green bolls, but yet insuring positive movement of aggregate for choke-free field operation in a wide range of field conditions.

As the aggregate is conveyed toward the upper end of each auger 50 it is transformed by the separation of trash into a conglomerate of essentially lint cotton and green bolls. It is this conglomerate that is caught by the revolving element 56 and impelled through a conglomerate discharge opening 60 which communicates the upper discharge portion 58 of housing 52 with the pneumatic separator 32.

It is shown in FIGS. 5(a), 5(b), 5(c) the various patterns of distribution of conglomerate possible (as represented by arrows) within the separator 32 for a dual vertical auger-separator system. FIG. 5(a) illustrates a divergent type pattern when the augers 50 rotate opposingly away from each other at the position of discharge. FIG. 5(b) illustrates how a crosswise pattern can be obtained by rotating the augers 50 opposingly toward each other at the position of discharge. FIG. 5(c) shows a third alternative of rotating augers 50 in the same direction producing a contiguous type pattern of distribution within the pneumatic separator 32.

The pneumatic separator 32 for separating the lint cotton from the green bolls has a unique make-up resulting in a novel pneumatic separating process. Referring to FIG. 2 it can be seen that the pneumatic separator 32 includes an enclosed duct-like structure comprising a generally vertical wall 62 disposed adjacent said housing 52 and communicating therewith through opening 60. Opposite wall 62 is disposed a wall 64 having a generally vertical upper segment 66 being opposite said opening 60 and extending upwardly to communicate with discharge duct 36. Lateral walls 70, 72 also being generally vertical complete the duct-like structure which includes a duct segment 74 having a substantially constant rectangular cross section between lines A—A and B—B (FIG. 2). The upper portion of segment 74 communicates with discharge duct 36 to form a continuous air passage for conduction of air-entrained lint cotton to the trailer 24. It should be observed that the cross sectional area of discharge duct 36 is substantially reduced relative to that of segment 74 to effect a corresponding increase in velocity of the air stream through the discharge conduit 36 to assure effective conduction and discharge of lint cotton over a wide range of field conditions.

Below line A—A wall 64 comprises a downwardly sloping segment 68 which extends inwardly of the duct-like structure to a distal end portion 76 thus forming a lower opening 78 at line C—C.

Below line C—C separator 32 comprises an enclosure housing the blower 34 and an adjacent green boll collecting space 80. The air stream from blower 32 is discharged upwardly through an enclosed interior channel 82 comprising a wall 84 contiguous with duct wall 62 and an opposite inner wall 86 in proximate alignment with the distal end portion 76 of lower wall segment 68. Both walls 84 and 86 extend between lateral walls 70, 72 and terminate below the distal end portion 76 of wall segment 68 and form an air discharge opening 88 having a downwardly and inwardly sloping grate-like cover 90 structured to allow the air stream to flow upwardly therethrough but to prevent gravitating green bolls from entering the interior channel 82. It should be noted that the dispositional relationship between distal end portion 76 and grate-like cover 90 is such that a sufficient spacing 92 is allowed therebetween to permit passage to the downwardly trending green bolls into the green boll collecting space 80.

The operation of this pneumatic separator can best be explained by referring to actual test measurement made on a device herein disclosed. FIG. 3 is a side view of the separator 32 denoting the location of test holes, each representing an air velocity test station and each station having a numerical designation. The arrows corresponding to each test station are generally indicative of the direction of flow of the air stream at that particular station. FIG. 4 depicts a top view of a typical test station showing alphabetically designated traverse test positions at which the air velocity and direction was tested.

Typical test data has been compiled in Table 1 below. Table 1 lists air velocities in feet per minute (ft./min.) within the separator 32 at each test station for each alphabetically designated position for that station. Negative numbered velocities of stations 9, 10 and 14 indicate air flow direction substantially contra to the general direction of flow and correspond to the arrow directions of those stations as depicted in FIG. 3.

TABLE 1

Air Velocities in Feet Per Minute (Ft./Min.)

| Test Station | Traverse Test Positions | | | | | |
|---|---|---|---|---|---|---|
| | a | b | c | d | e | f |
| 1 | 3,709 | 3,800 | 3,842 | 3,709 | 3,709 | 3,625 |
| 2 | 3,800 | 3,537 | 5,582 | 3,582 | 3,537 | 3,582 |
| 3 | 3,758 | 3,398 | 3,254 | 3,351 | 3,303 | 3,445 |
| 4 | 0 | 0 | 0 | 566 | 0 | 0 |
| 5 | 981 | 1,602 | 1,133 | 566 | 566 | 566 |
| 6 | 2,042 | 2,469 | 2,656 | 2,042 | 2,260 | 1,387 |
| 7 | 2,469 | 2,997 | 2,656 | 2,888 | 2,716 | 2,595 |
| 8 | 2,119 | 2,775 | 3,102 | 3,050 | 2,832 | 2,775 |
| 9 | −1,602 | −1,602 | −1,602 | −1,602 | −1,699 | −1,699 |
| 10 | 0 | −566 | −566 | −1,133 | −1,387 | −1,266 |
| 11 | 981 | 1,266 | 2,260 | 1,266 | 981 | 1,133 |
| 12 | 3,398 | 3,445 | 4,085 | 3,884 | 2,832 | 2,595 |
| 13 | 4,238 | 4,200 | 4,005 | 4,005 | 4,276 | 4,386 |
| 14 | −1,498 | −1,387 | −1,387 | −1,387 | −1,498 | −1,498 |
| 15 | 4,566 | 4,531 | 4,566 | 4,601 | 4,531 | 4,873 |

By referring to FIG. 3 and the test data of Table 1 (9a thru f and 10a thru f) it can be readily observed that a counter air stream flowing contra the main air stream has produced a region of air counter flow within the upper duct segment adjacent to upper wall segment 66. It should also be noted that this region of air counter flow is substantially transversely aligned with aggregate opening 60 in wall 62.

The separating process in pneumatic separator 32 begins with the paddle-like element 56 engaging the upwardly moving conglomerate and slinging said conglomerate in a transverse direction through conglomerate discharge opening 60 into the main air stream flowing upwardly past said opening 60. As the conglomerate courses transversely through the main air stream a bulk of the lint cotton is caught up by the air stream and blown through the discharge conduit 36 into trailer 24. However a residue comprising of the green bolls and remaining lint cotton continues on through the main air stream and impinges on wall 66 within the region of air counter flow. This residue is then thrust downwardly by the counter air stream and moves descendingly along lower wall segment 68 and drops off the distal end portion 76 into the main stream which scours the green bolls and entrains the remaining lint cotton to be carried upwardly and discharged as heretofore described. The green bolls, however, being much more dense than the lint cotton drop off of distal end portion 76 and continue to descend onto the grate-like cover 90 and roll downwardly through spacing 92 gravitating into space 80 for collection.

Having described the preferred form of the invention it will be readily apparent that various other embodiments of the invention will become obvious within the scope of the foregoing disclosure and within the scope of the appended claims.

What is claimed is:

1. In a cotton harvester having a unit for harvesting an aggregate including lint cotton and green bolls, separator means, means for delivering said aggregate from said unit to said separator means, said separator means comprising an uprightly oriented duct having first and second opposed side walls extending between an underposed air inlet and a superposed cotton discharge outlet, blower means having a discharge communicating with said air inlet and producing an upwardly directed main air stream adjacent said first wall for conducting lint cotton entrained therein through said cotton discharge outlet, means producing a coexistent air counter flow within said duct in a region between said main air stream and said second wall, means projecting the aggregate into said duct through an opening in said first wall across the main air stream toward said second wall into said region of air counter flow, wherein the green bolls and remaining lint cotton which traverse the main air stream are directed to reenter the main air stream for further separation, a green boll receptacle disposed adjacent the air inlet and communicating with said duct for collecting separated green bolls.

2. The invention according to claim 1 and said air inlet including an air nozzle comprising an interior partition disposed across said duct in spaced relation to said first wall and terminating below said aggregate opening in said first wall, said nozzle operative to direct said main air stream from said blower means upwardly across said opening in said first wall toward said cotton discharge outlet.

3. The invention according to claim 2 and said means for producing the air counter flow comprising an inclined wall section extending from said second wall downwardly toward said first wall to provide a downwardly extending volumetric attenuation of said duct, and said incline wall section terminating in a distal end portion above and proximate to the interior partition of said nozzle, said wall section effective to direct the air counter flow into the main air stream and provide a boll passage thereat into said green boll receptacle.

4. The invention according to claim 3 and said nozzle including a sloping grille-like structure extending across said duct downwardly from said first wall to said interior partition to prevent green bolls from entering the air inlet and providing a perforate surface on which green bolls can roll downwardly through the boll passage into the receptacle.

5. The invention according to claim 3 and said separator including a lint cotton discharge conduit conductively connected to the duct in communication with said cotton discharge outlet, and said discharge conduit having a cross sectional area less than said discharge outlet to produce a substantial increase of air velocity in the discharge conduit to effect a conduction of the lint cotton therein to associated collecting means.

References Cited

UNITED STATES PATENTS

| 1,863,666 | 6/1932 | Lorentz | 209—133 |
| 3,086,533 | 4/1963 | Touton | 209—136 XR |
| 3,119,768 | 1/1964 | Van Buskirk | 209—133 |
| 3,397,522 | 8/1968 | Sanderson | 56—30 |

FOREIGN PATENTS

| 820,513 | 8/1937 | France. |
| 1,122,543 | 5/1956 | France. |

FRANK W. LUTTER, Primary Examiner

U.S. Cl. X.R.

209—139, 147, 153